Figure 1:
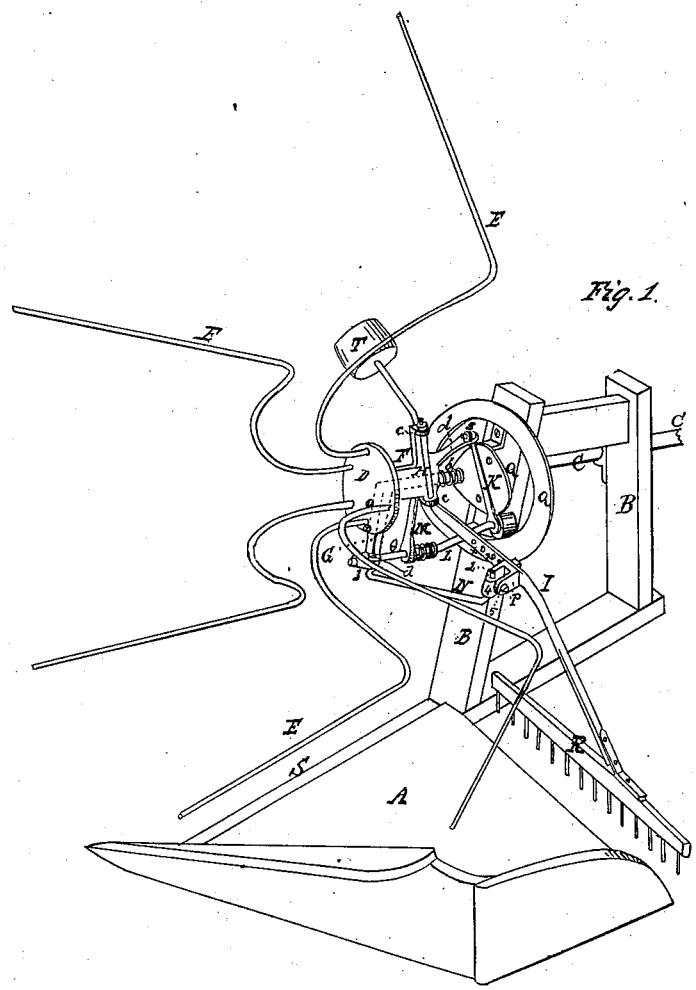

Sheet 1. 2 Sheets.

M$^c$C. Young, Jr.
Harvester Rake.

N° 30103  Patented Sep. 18, 1860.

Witnesses.
E. Cohen
J. Hersch

Inventor.
M$^c$Clintock Young.
By atty
A.B. Stoughton

McC. Young, Jr.
Harvester Rake.
Nº 30103  Patented Sep. 18, 1860.
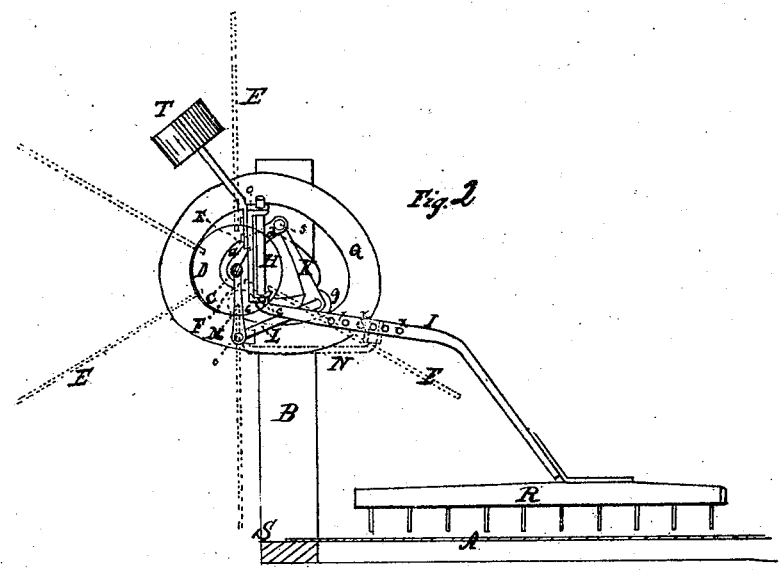
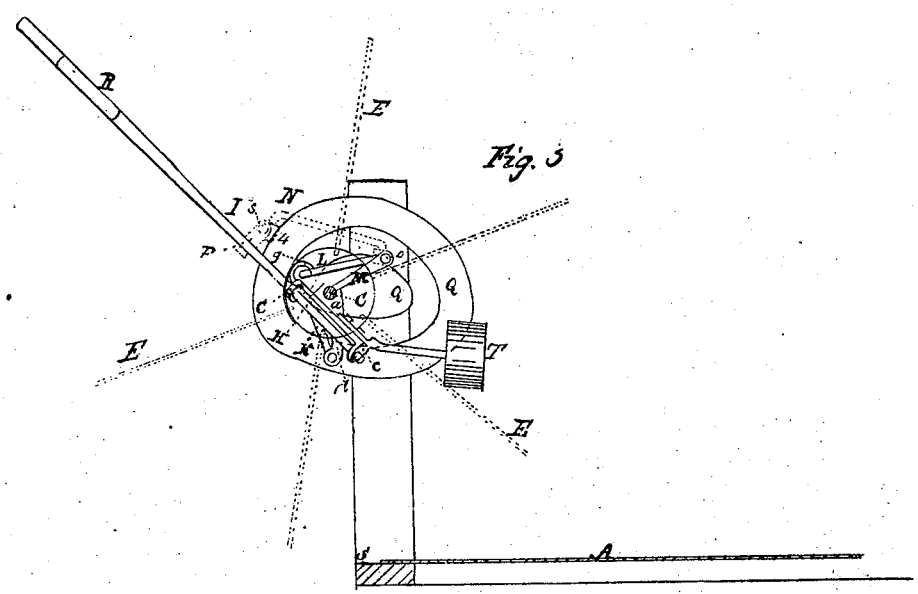

# UNITED STATES PATENT OFFICE.

McCLINTOCK YOUNG, JR., OF FREDERICK, MARYLAND.

IMPROVEMENT IN COMBINED RAKE AND REEL FOR HARVESTERS.

Specification forming part of Letters Patent No. 30,103, dated September 18, 1860.

*To all whom it may concern:*

Be it known that I, McCLINTOCK YOUNG, Jr., of the city and county of Frederick, and State of Maryland, have invented certain new and useful Improvements in a Combined Rake and Reel for Harvesting-Machines; and I do hereby declare that the following is a full, clear, and exact description of the construction and operation of the same, reference being had to the accompanying drawings, in which—

Figure 1 represents a perspective view of said combined rake and reel as applied to the platform of a harvesting-machine. Figs. 2 and 3 represent sections through the platform of said machine, showing the rake and reel in different positions.

My invention relates to that class of revolving reels which are supported on one side only of the platform of a harvesting-machine, while their arms extend and revolve over said platform; and it consists in the combination of said reel with a rake and inclined reel-shaft, by which the rake is operated in such a manner as that it shall perform the functions of a reel until it arrives over the front end of the platform, and then its motion be automatically changed in direction and motion, so as to cause it to sweep the grain from said platform while passing over the same, as will be explained.

To enable others skilled in the art to make and use my invention, I will proceed to describe its construction and operation.

A represents the platform of a harvesting-machine, and B represents part of the frame of said machine which supports the inclined reel-shaft C. The plate D is secured to the end of said shaft, and the reel-arms E are secured to the plate D, and diverging and curving from said plate they extend over the platform and act in the usual manner of reels when the shaft C is turned.

F represents a rake-supporter, which is hung loosely on the shaft C by means of the lugs *a*. It is prevented from moving longitudinally by the spring *b*, which presses it against the arm G, which is a prolongation of the reel-shaft. The shank H of the rake-arm I passes through the lugs *c* of the plate F, and said rake-arm can freely turn on said shank. A crank-arm, *d*, extends from the plate F, and to its end is pivoted the link K, to which the crank-arm L is also attached, to which arm L a guide-roller, *g*, is pivoted. The crank-arm L turns on its portion *o*, which latter is supported by the arm G and in the pillar M of the reel-shaft.

N represents a brace-rod, one end of which is hung to a turning box or collar, 3, on the end of the rod *o*, while its other end is connected to a similar turning box or collar, 4, on the rake-arm I. It (the brace-rod) transfers the combined motions of the reel-shaft and of the guide-roller *g* to the rake-arm 1, and for that purpose has a compound motion. Its bent ends 1 and 2, as above stated, pass through the boxes or collars 3 and 4, the former of which is hung to the shaft *o*, and can turn thereon, while the latter is hung to the pivoted bracket P of the rake-arm I, so as also to freely turn on the pivots 5 as well as in the piece 4.

When the parts are in the position represented in Fig. 3, the reel-shaft C being turned, it carries the rod *o* around with it, and the crank-arm L causes the guide-roller *g* to pass through the cam-groove of the cam Q, the shape of the cam-groove being such as to cause the roller *g* to act through the link-arm K on the crank-arm *d* of the plate F, and to cause the latter to turn simultaneously with the reel-shaft, and consequently the rake-head R will perform the function of a reel-arm or move in the same path and at the same velocity with the reel-arms. This motion continues until the rake-head R arrives at or over the edge S of the platform. When the guide-roller *g* is in the position 6 (represented in dotted lines in Fig. 2) the shape of the cam Q from the point 6 to the roller *g* is that of an arc of a circle struck from the center 8 of the arm *d*, and while passing through that part of the cam-groove the roller *g* has no tendency to act on the arm *d* and plate F, which consequently remain stationary during that period, and thus the rake does turn with the reel-shaft. In this position the shank H of the rake-arm I stands perpendicularly, and as the motion of the reel-shaft C continues the part *o* and connecting-rod N cause the rake-arm I to turn on its perpendicular shank H. The rake R is therefore turned horizontally over the platform A and sweeps the grain off, and as soon as it has arrived at the rear end of the platform, as represented in Fig. 1, the roller *g*, by reason of the peculiar shape of the cam Q, operates the link K, arm *d*, and the plate F, causing the rake-arm I to assume the radial position, and to act as a reel-arm again. To prevent the rake from descending suddenly on the platform, I attach a counterpoise, T, to the plate F opposite the shank H, whereby the weight of the rake is balanced, and all sudden jerks or jars are prevented. The length of the horizontal or sweeping motion of the rake can be adjusted by adjusting the position of the bracket P on the rake-arm I, which can be accomplished by means of the holes $x$, through either of which the bolt may be passed, which secures said bracket to the rake-arm, and the nearer the bracket P is secured to the shank H the longer will be the sweeping or horizontal motion of the rake, and vice versa.

Having thus fully described the nature and object of my invention, what I claim therein as new, and desire to secure by Letters Patent, is—

1. In combination with a continuously-revolving inclined reel-shaft and a stationary cam, a rake and reel having the corresponding and differential motions herein set forth while turning with said shaft, substantially as described.

2. In combination with a rake turning on the same shaft with the reel, but in a variable path therewith, a counterpoise to prevent said rake from suddenly rising or falling, substantially as and for the purpose described.

McCLINTOCK YOUNG, Jr.

Witnesses:
A. B. STOUGHTON,
E. COHEN.